United States Patent [19]

Hicks, Jr.

[11] Patent Number: 5,048,688
[45] Date of Patent: Sep. 17, 1991

[54] SCRATCH PREVENTION PAN LINER

[76] Inventor: Ernest W. Hicks, Jr., 2820 Rose Ave., #56, San Jose, Calif. 95127

[21] Appl. No.: 643,324

[22] Filed: Jan. 22, 1991

[51] Int. Cl.$^5$ .............................................. B65D 21/04
[52] U.S. Cl. .................................. 206/501; 206/514; 206/821
[58] Field of Search ............... 206/514, 501, 507, 564, 206/518, 821, 520

[56] References Cited

U.S. PATENT DOCUMENTS

| | | | |
|---|---|---|---|
| 1,468,748 | 9/1923 | Schuman | 206/821 |
| 1,754,812 | 4/1930 | Zacharias | 206/821 |
| 2,826,333 | 3/1958 | Rodemich | 206/821 |
| 2,949,184 | 8/1960 | Lehner et al. | 206/821 |
| 3,358,878 | 12/1967 | Ostborg et al. | 206/514 |
| 3,526,138 | 9/1970 | Swett et al. | 206/514 |
| 4,204,609 | 5/1980 | Kuhn | 206/514 |
| 4,643,312 | 2/1987 | Zarges | 206/514 |
| 4,756,420 | 7/1988 | Deaton | 206/514 |

FOREIGN PATENT DOCUMENTS 1818013  3/1977  Fed. Rep. of Germany ...... 206/514

Primary Examiner—Joseph Man-Fu Moy
Attorney, Agent, or Firm—John J. Leavitt

[57] ABSTRACT

The scratch prevention pan liner in one aspect includes a monolithic body having a configuration conforming to the inner non-stick coated surface of a unit of cookware, the monolithic body being formed with a recess in its upper surface to receive the bottom surface of a superposed cookware unit. In a second aspect, the liner is formed from a dish-shaped member provided with a central pad from which radiate ribs configured to form a recess within which a superposed unit of cookware may be nested. To align and retain the handles of multiple cookware units oriented in a common vertical plane, U-shaped members are provided to cradle and embrace such handles.

9 Claims, 2 Drawing Sheets

SCRATCH PREVENTION PAN LINER

BACKGROUND OF THE INVENTION

1. Field of the Invention.

This invention relates to non-stick type frying cookware, such as frying pans having a coating to prevent food from sticking to the pan, and particularly to liner elements adapted for insertion between such pans when not in use to prevent the non-stick coating thereon from becoming scratched.

2. Description of the Prior Art.

A diligent search through retail outlets that sell cookware treated to produce a cooking surface on the pan to which food will not stick has failed to reveal the existence of a liner for such pans that permits nesting of several such pans yet prevents contact of the treated cooking surface of one pan by the metallic bottom of the pan above. Accordingly, it is one of the important objects of the present invention to provide a liner that may be accommodated between nested non-stick cookware so as to prevent the nested pans from coming into direct contact with each other.

Fry pans having internal cooking surfaces treated to be non-sticking in relation to food cooked therein are usually formed from an appropriate metal, such as aluminum, and are frequently formed in sizes such that one pan will nest within the next lower pan. Unless the pans are protected from each other, the exterior metallic bottom of each nested pan rests on the interior treated surface of the pan below. Such contact causes abrasions to be formed in the treated non-stick surface which, over time, become quite extensive and thus provide areas on the pans to which the food will stick, thus defeating the purpose of treating the pan to provide the non-stick surface. Accordingly, another object of the present invention is to provide a set of scratch prevention liners that cooperate with the associated pans to provide a "nest" within each pan which supports the pan above it in complete isolation from the pan within which the "nest" liner is enclosed.

Another object of the invention is the provision of a set of scratch prevention liners of varying size to accommodate the different sizes of cookware, particularly fry pans.

When a multiplicity of fry pans of the type treated to provide a non-stick coating on the interior cooking surface are nested together without the presence of a liner, the handle of each pan above the bottom pan rests on the rim of the pan below. This results in the pans lying in non-parallel planes, with the handles extending from the pans in non-parallel planes. It is therefore another object of the invention to provide a set of scratch prevention liners that cooperate with the fry pans to isolate one pan from the adjacent pans and to support each pan in a plane that is horizontal to the plane in which each of the other pans is supported.

From a marketing point of view, it is an advantage for manufacturers to pack multiple fry pans in a single package, so that a customer may then buy a "set" of such pans, each of a different size and having utility for a different purpose. One problem that arises from this concept is that the pans are apt to be abraded during transit because the bottoms of some of the pans rest on the interior treated cook surface of the pans below. Also, because of the uneven alignment of the pans, due to the fact that the handles of upper pans rest on the rims of the pans below, it is difficult to package multiple pans in one package. It is therefore another object of the invention to provide a "set" of fry pan liners that retains a multiplicity or "set" of superposed fry pans in parallel planes, isolated against contiguity, yet providing a "nest" within which each superposed pan is supported on the pan below.

When a multitude of non-stick type fry pans are stacked one above the other, it is an advantage that the handles of all the pans project in the same direction, all lying in a common vertical plane that includes the geometric center of the fry pan cooking surface. Accordingly, yet another object of the invention is the provision of a "set" of scratch prevention pan liners that function to retain the handles of stacked fry pans oriented in a vertical plane common to all of the handles.

Since the primary purpose of the invention is the prevention of scratches being formed in the non-stick surface of a fry pan, a still further object of the invention is the provision of a liner that is non-abrasive to the non-stick cooking surface of the pan within which it is cradled.

The invention possesses other objects and features of advantage, some of which, with the foregoing, will be apparent from the following description and the drawings. It is to be understood however that the invention is not limited to the embodiment illustrated and described since it may be embodied in various forms within the scope of the appended claims.

SUMMARY OF THE INVENTION

In terms of broad inclusion, the scratch prevention pan liner of the invention, in one aspect, comprises a layer of synthetic resinous material having a thickness substantially equal to the depth of the pan within which it is nested, and configured to conform to the interior surface of the pan within which it is nested. Additionally, the liner is formed with a central recess that partially matches the exterior configuration and dimensions of a smaller fry pan adapted to be superposed within the liner and above the pan below. In another aspect of the invention, a "set" of such liners is provided, each having an exterior configuration that conforms to the fry pan within which it is supported, and each having a central recess within which the pan above is nested in coaxial superposed relationship to the pan below on which it is non-contiguously or indirectly supported. In a third aspect of the invention, means are provided on each component of a "set" of such fry pan liner components operative to retain the handles of the stacked fry pans oriented in a common vertical plane.

DESCRIPTION OF THE PREFERRED EMBODIMENT

Figure 2:
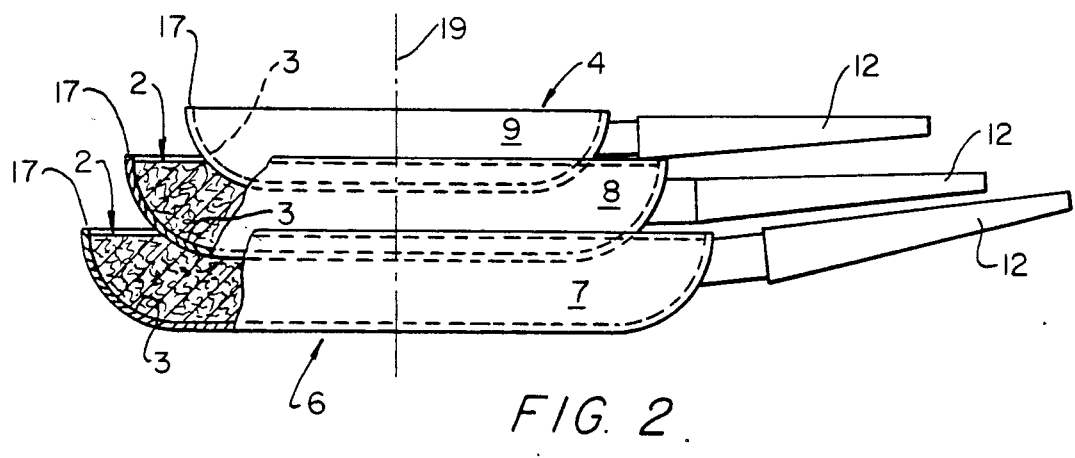
FIG. 2 is a view similar to FIG. 1 but illustrating the orientation of the fry pans when my pan liner is used.
Figure 3:
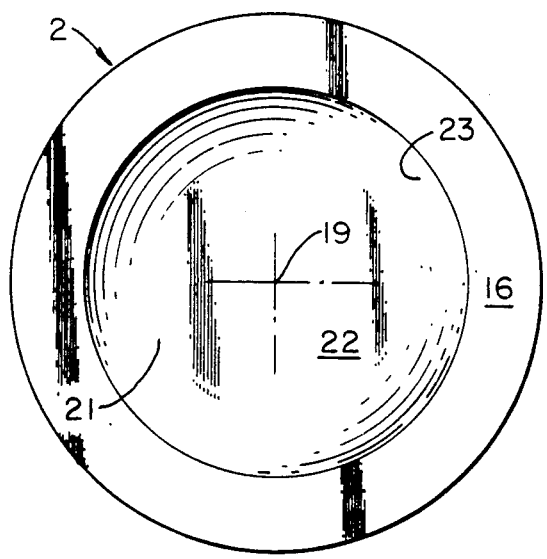
FIG. 3 is a plan view of one of my scratch prevention pan liners.
Figure 4:
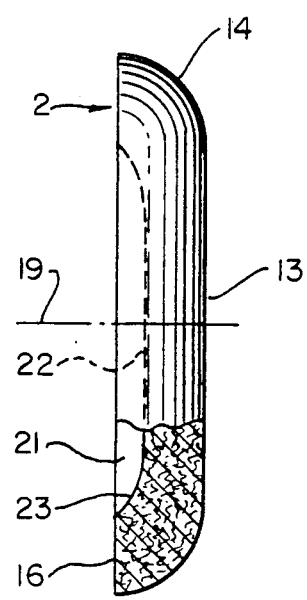
FIG. 4 is an edge view of the pan liner illustrated in FIG. 3. A portion of the liner is broken away to reveal the structure thereof.

In terms of greater detail, the scratch prevention pan liner of the invention comprises, in one aspect as shown in FIGS. 2-4, a generally circular liner designated generally by the numeral 2, formed from a preformed pad of an appropriate synthetic resinous material such as open cell polyurethane, or other material that will not scratch the treated non-stick cooking surface 3 of the fry pan designated generally by the numeral 4 when the liner is "nested" within the interior of the fry pan as illustrated in FIG. 2.

It is well known that fry pans of the type illustrated are fabricated in various sizes, usually in a "set" designated generally by the numeral 6, and varying by two inches in diameter, such as 10" for the fry pan 7 shown in FIG. 2, and constituting the lowermost fry pan of the set, 8" for the fry pan 8 superposed above the fry pan 7, followed by the 6" fry pan 9 superposed above the fry pan 8. When desired, the first pan of the set may be 12" in diameter and be disposed below the fry pan 7. The larger fry pan of the set is of course useful, for instance, for frying chicken parts, while the smaller pan of the set is useful for frying individual servings, such as fried eggs.

It is my observation, from inspecting many non-stick fry pans in retail establishments, that regardless of diameter, the fry pans appear to have substantially the same depth. This may of course vary from one manufacturer to another. It has been noted also that some of these fry pans have handles 12 that are heat resistant, while others have handles (not shown) that are formed from a metallic material that appears to be the same material from which the pan body is formed, usually aluminum, but which in fact may be an appropriate metallic alloy the heat conduction characteristics of which suit it for its purpose.

Figure 1:
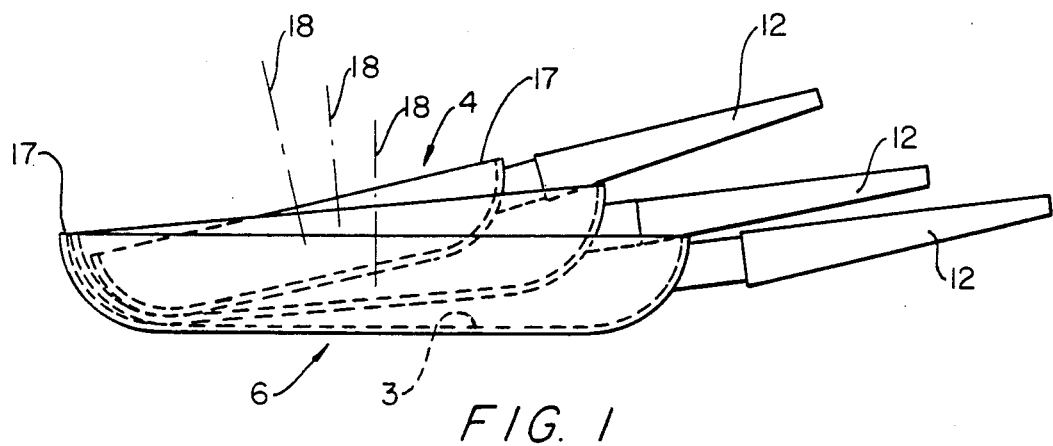
FIG. 1 is a side elevational view illustrating the orientation of a multiplicity of fry pans as conventionally superimposed without benefit of my liner.

In the interest of brevity in this description, since each liner of the set 6 of liners is identical with the other liners of the set except for diametric and perhaps thickness dimensions, only one of the liners will be described in detail. Thus, referring to FIGS. 3 and 4, it will be seen that the liner 2 is formed circular in configuration, but could be whatever configuration, dictated by the configuration of the fry pan or cookware for which it is intended for use. The liner is formed, conveniently by pressure forming, to have a thickness substantially the same as or slightly less than the interior depth of the fry pan, and to have a generally flat bottom surface 13 that merges smoothly with side surfaces 14, the bottom and side surfaces conforming closely to the configuration of the interior cooking surfaces of the fry pan. The top surface 16 is also preferably flat, lying in a plane substantially coincident with the plane of the top rim 17 of the fry pan when nested therein as shown in FIG. 2. For the circular fry pans as shown in FIG. 1, it will thus be seen that each fry pan is formed symmetrical about a central axis 18 that is perpendicular to the flat interior cook surface of the fry pan. In the same manner, the liner 2 is symmetrical about a central axis 19 that is coincident with the axis 18 when the liners are nested within the fry pans as shown in FIG. 2.

Formed in the top surface of the liner 2 is a recess 21 that is shown in the illustrations as being circular and having a depth less than the thickness of the liner pad to provide a bottom wall 22 that conforms in size and shape to the bottom surface of a fry pan or cookware intended to be nested in the recess 21. As shown, the side walls 23 of the recess also conform at least partially with the configuration of the exterior side walls of the fry pan or cookware to be nested within the recess. Thus, when the liner pad lies nested within the fry pan, it substantially fills the interior of the pan, preventing contact of a superposed pan with the non-stick treated interior surface of the fry pan. Coincidently, the fry pan that is superposed above the lower fry pan is itself nested within the recess 21, so that the pans, or the entire set thereof, are retained coaxially related to one another (FIG. 2), with their collective top rims parallel with each other. There is thus no opportunity for the pans to slip sideways or to become dislodged or to contact an adjacent pan. This integration of the multiple pans making up a set enables a manufacturer to more easily package the set because the set of fry pans, separated or isolated by the liner pads, form a firm base about which packaging material may be applied.

Figures 5, 6:
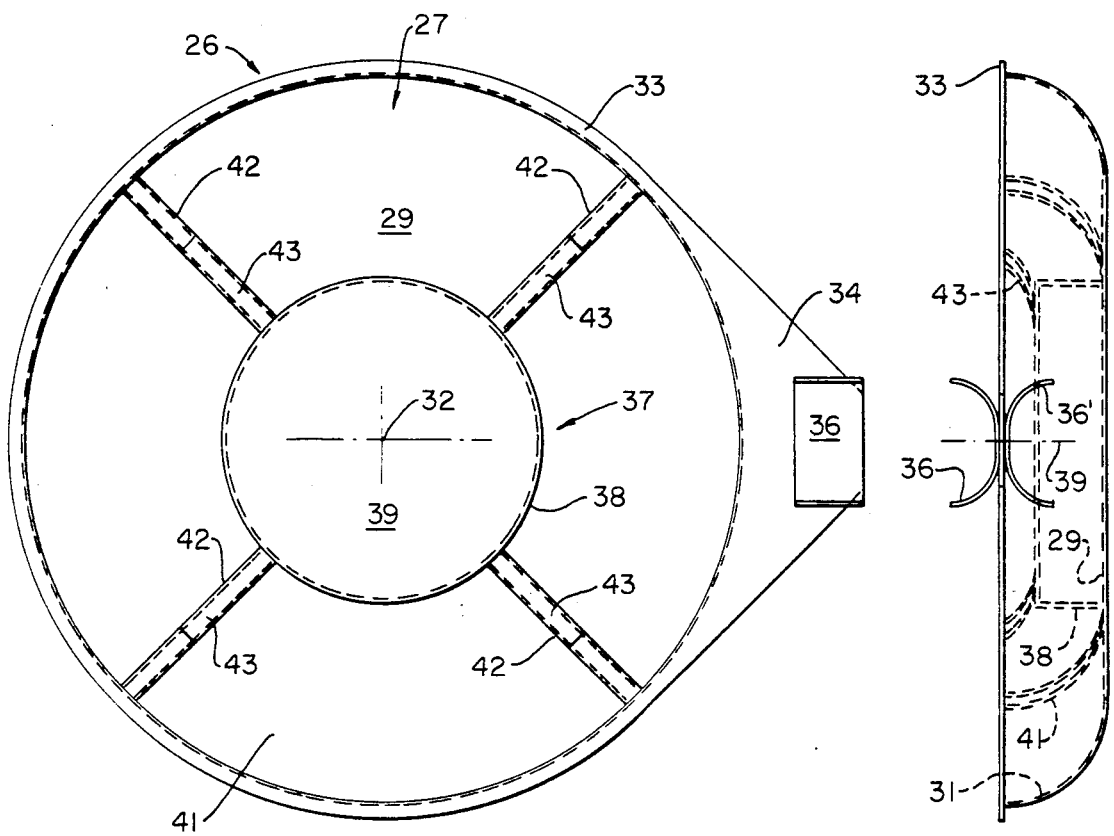
FIG. 5 is a plan view of a second embodiment of my scratch prevention pan.
FIG. 6 is an edge view of the pan liner illustrated in FIG. 5.
Figure 7:
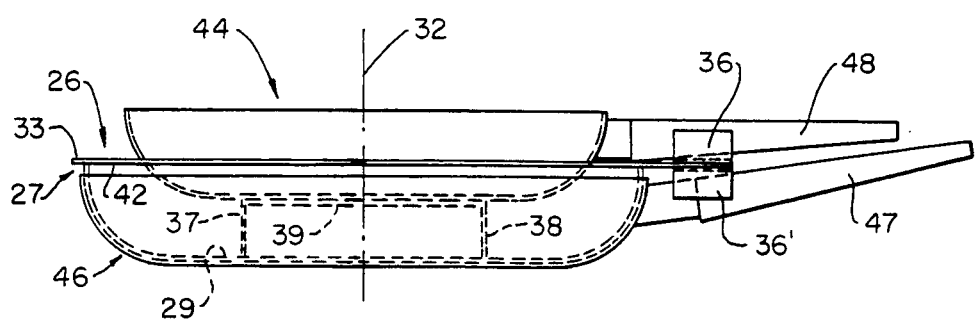
FIG. 7 is a side elevational view of the pan liner embodiment illustrated in FIG. 5, shown in position of use between two fry pans.

A second embodiment of the invention is illustrated in
FIGS. 5-7. This embodiment, while different in structure performs the same function as the embodiment illustrated in FIGS. 1-4.

Referring to FIG. 5, it will be seen that the non-scratch fry pan liner of this embodiment is designated generally by the numerals 26, and includes a shallow dish-shaped member designated generally by the numeral 27. The member 27 is preferably formed from an appropriate material, such as cardboard, that will not scratch or otherwise abrade the non-stick cooking surface of a fry pan 28 (FIG. 7). It is configured to conform to the inner cooking surface of the fry pan.

In this respect, the member 27 is provided with a bottom wall portion 29 that merges smoothly with circular side walls 31 that are symmetrical about a central axis 32. A flat rim member 33 is integral with the upper edge of the side walls as shown, and includes a radially extending portion 34 that extends in the same plane as the rim 33. The extension portion 34 is tapered away from the rim member 33, and at its apex serves to support two channel members 36 and 36', the function of which will be explained hereinafter.

Fixed within the dish-shaped member 27 and centrally disposed on the bottom 29, is a cylindrical pad designated generally by the numeral 37 and having cylindrical walls 38 and a top wall 39, preferably formed from the same material as the bottom. While I have illustrated the pad as being attached to the bottom, it should be understood that the pad and dish-shaped member could be integrally formed as by injection molding from synthetic resinous material, or could be formed from fibrous material analogous to the material from which some egg cartons are formed.

Since the pad 37 is centrally disposed within the dish-shaped member 27, there is provided between the cylindrical pad and the side walls of the dish-shaped member an annular channel 41. Within this channel there is mounted a plurality of radially extending ribs 42 that engage and are secured to the bottom wall portion 29, and extend upwardly to a top edge portion 43 conforming to the configuration of the bottom wall portion 29 and its transition into side walls 31. As seen in FIG. 7, the top edge portions 43 of ribs 42 merge smoothly with the top surface 39 of pad 37, and provide a recessed seat to conformably accommodate the complementarily configured bottom portion of a superposed fry pan designated generally by the numeral 44. At their inner ends, the ribs are secured to, or are integral with, the central pad 37, while at their outer ends, the ribs abut and are secured to the side walls of the 31, or merge integrally therewith.

While I have illustrated the non-scratch fry pan liner 26 as formed from separate components assembled to form a unitary structure, it is contemplated that mass production techniques will be used to form the entire liner as one integral and monolithic unit. Various manufacturing techniques may be utilized for this purpose, including, but not limited to, injection molding of synthetic resinous materials, pressure forming of fibrous materials, or vacuum forming, among other techniques.

Referring to FIG. 7, it will be seen that with the liner 26 nested within the lowermost fry pan 46, the handle 47 of pan 46 is embraced by the channel member 36' which opens downwardly as shown. This orients the liner in relation to the handle, the tapered extension 34 extending radially over the handle. When the pan 44 is superposed and nested in the "recess" formed by the upper edge portions 43 of the ribs 42 and the top surface 39 of cylindrical pad 37, the handle 48 of the superposed pan 44 is cradled by the upwardly opening channel member 36 as shown. The handles 47 and 48 of nested pans 46 and 44 are thus oriented one above the other in a common vertical plane. This greatly facilitates packaging of the "set" of multiple fry pans for retail sale. It also facilitates storage of the multiple fry pans on a horizontal shelf with the liners in place as illustrated, particularly in FIGS. 2 and 7.

Having thus disclosed the invention, what is believed to be new and novel and sought to be protected by letters patent of the United States is as follows.

I claim:

1. As an article of manufacture, a non-scratch liner for cookware having a non-stick coating on a cooking surface thereof enabling the superposition of a multiplicity of such cookware units when not in use without scratching the non-stick coating, comprising:
    a) a unitary main body portion having a surface conforming to the configuration of the interior cooking surface of an article of cookware having an upper rim and a cooking surface coated with a non-stick surface coating, said unitary main body portion having a thickness substantially correlated to the depth of the cookware and a top surface substantially parallel to the top rim of the cookware and adapted for removal when the cookware is in use; and
    b) a recess formed in the top surface of said main body and configured to receive and support nested in said recess a superposed cookware unit that is not in use whereby the superposed cookware unit lies isolated in non-contiguous relation to the non-stick cooking surface of the cookware unit therebelow within which said non-scratch liner is nested.

2. The article of manufacture according to claim 1, wherein said non-scratch liner for cookware is fabricated from a synthetic resinous material.

3. The article of manufacture according to claim 1, wherein said non-scratch liner for cookware is fabricated from a fibrous natural material.

4. As an article of manufacture, a non-scratch liner for cookware having a non-stick coating on a cooking surface thereof enabling the superposition of a multiplicity of such cookware units when not in use without scratching the non-stick coating, comprising:
    a) a main body portion having a surface conforming to the configuration of the interior cooking surface of an article of cookware having an upper rim and a cooking surface coated with a non-stick surface coating, said main body portion having a thickness substantially correlated to the depth of the cookware and a top surface substantially parallel to the top rim of the cookware;
    b) a recess formed in the top surface of said main body and configured to receive and support thereon a superposed cookware unit whereby the superposed cookware unit lies isolated in non-contiguous relation to the non-stick cooking surface of the cookware unit therebelow within which said non-scratch liner is nested; and
    c) wherein said non-scratch liner for cookware includes means for cradling a handle portion of a superposed unit of cookware.

5. As an article of manufacture, a non-scratch liner for cookware having a non-stick coating on a cooking surface thereof enabling the superposition of a multiplicity of such cookware units when not in use without scratching the non-stick coating, comprising:
    a) a main body portion having a surface conforming to the configuration of the interior cooking surface of an article of cookware having an upper rim and a cooking surface coated with a non-stick surface coating, said main body portion having a thickness substantially correlated to the depth of the cookware and a top surface substantially parallel to the top rim of the cookware;
    b) a recess formed in the top surface of said main body and configured to receive and supported thereon a superposed cookware unit whereby the superposed cookware unit lies isolated in non-contiguous relation to the non-stick cooking surface of the cookware unit therebelow within which said non-scratch liner is nested; and
    c) wherein said non-scratch liner for cookware includes means for embracing a handle portion of the cookware unit in which said non-scratch liner is nested.

6. As an article of manufacture, a non-scratch liner for cookware having a non-stick coating on a cooking surface thereof enabling the superposition of a multiplicity of such cookware units when not in use without scratching the non-stick coating, comprising:
    a) a main body portion having a surface conforming to the configuration of the interior cooking surface of an article of cookware having an upper rim and a cooking surface coated with a non-stick surface coating, said main body portion having a thickness substantially correlated to the depth of the cookware and a top surface substantially parallel to the top rim of the cookware;
    b) a recess formed in the top surface of said main body and configured to receive and supported thereon a superposed cookware unit whereby the superposed cookware unit lies isolated in non-contiguous relation to the non-stick cooking surface of the cookware unit therebelow within which said non-scratch liner is nested;
    c) wherein said non-scratch liner for cookware is fabricated from a synthetic resinous material; and
    d) wherein said main body portion includes a dish-shaped member conforming to the configuration of the interior coking surface of the unit of cookware in which said non-scratch liner is to be nested, said dish-shaped member having a circumstantial rim lying in a plane including the upper surface of said dish-shaped member, a cylindrical pad formed on the interior of said dish and having a top surface lying in a plane below the plane of said upper surface, and a plurality of radially extending ribs spaced circumferentially about said cylindrical pad and the interior of said dish-shaped member, the upper edges of said radially extending ribs being configured to form a recess within which a unit of cookware may be nested and supported.

7. The article of manufacture according to claim 6, wherein said circumferential rim of said dish-shaped member includes a cantilever portion extending radially outwardly from said circumferential rim, and means are provided on the cantilever portion adapted to cradle a handle portion of a unit of cookware superposed on said non-scratch liner.

8. The article of manufacture according to claim 7, wherein means are provided on the cantilever portion adapted to embrace a handle portion of a unit of cookware within which said non-scratch liner is nested, whereby a plurality of cookware units each having a radially extending handle may be superposed one above the other with the handles of all the cookware units aligned in a vertical plane.

9. As an article of manufacture, a non-scratch liner for cookware having a non-stick coating on a cooking surface thereof enabling the superposition of a multiplicity of such cookware units when not in use without scratching the non-stick coating, comprising:

a) a main body portion having a surface conforming to the configuration of the interior cooking surface of an article of cookware having an upper rim and a cooking surface coated with a non-stick surface coating, said main body portion having a thickness substantially correlated to the depth of the cookware and a top surface substantially parallel to the top rim of the cookware;

b) a recess formed in the top surface of said main body and configured to receive and support thereon a superposed cookware unit whereby the superposed cookware unit lies isolated in non-contiguous relation to the non-stick cooking surface of the cookware unit therebelow within which said non-scratch liner is nested;

c) wherein said non-scratch liner for cookware is fabricated from a fibrous natural material; and d) wherein said main body portion includes a dish-shaped member conforming to the configuration of the interior coking surface of the unit of cookware in which said non-scratch liner is to be nested, said dish-shaped member having a circumstantial rim lying in a plane including the upper surface of said dish-shaped member, a cylindrical pad formed on the interior of said dish and having a top surface lying in a plane below the plane of said upper surface, and a plurality of radially extending ribs spaced circumferentially about said cylindrical pad and the interior of said dish-shaped member, the upper edges of said radially extending ribs being configured to form a recess within which a unit of cookware may be nested and supported.

* * * * *